United States Patent [19]

Lamparter

[11] Patent Number: 4,964,673
[45] Date of Patent: Oct. 23, 1990

[54] VEHICLE HATCH MOUNTING ASSEMBLY

[75] Inventor: Ronald C. Lamparter, Grosse Pointe Shores, Mich.

[73] Assignee: Transpec, Inc., Troy, Mich.

[21] Appl. No.: 452,352

[22] Filed: Dec. 19, 1989

[51] Int. Cl.$^5$ ............................................. B60J 7/08
[52] U.S. Cl. ................................... 296/216; 296/224; 49/193; 49/505
[58] Field of Search ................. 296/216, 224; 49/193, 49/402, 505

[56] References Cited

U.S. PATENT DOCUMENTS 4,495,731  1/1985  Sears ............................... 296/218 X

FOREIGN PATENT DOCUMENTS

1337047  7/1963  France ................................. 49/402
1011168  11/1965  United Kingdom ................ 296/216

Primary Examiner—Dennis H. Pedder
Attorney, Agent, or Firm—Reising, Ethington, Barnard, Perry & Milton

[57] ABSTRACT

A combined vent and escape hatch assembly for a vehicle roof of the type wherein the hatch is supported upon a pair of over-center hinge linkage devices one of which may be disconnected enabling the hatch to be fully opened for emergency exit purposes and wherein the other hinge device is protected against damage through the flexure of various hatch supporting components.

9 Claims, 6 Drawing Sheets

VEHICLE HATCH MOUNTING ASSEMBLY

TECHNICAL FIELD

The invention relates to a combined vent and escape hatch mechanism for vehicles and, more particularly, an improved mounting arrangement whereby the components of such a hatch are protected against damage.

BACKGROUND ART

The basic escape and ventilating hatch mechanism to which the present invention relates is shown in predecessor U.S. Pat. No. 4,021,073 entitled "COMBINED VENT AND ESCAPE HATCH". U.S. Pat. No. 4,495,731 represents an improvement over the early patent in providing a plastic hatch supporting ring adapted to be mounted directly to the vehicle roof. The later patent enabled the more accurate and easier mounting of the hatch assembly and further facilitated the use of an interior trim molding providing a more finished appearance to the hatch assembly.

Hatch assemblies made in accordance with the teachings of the two previously mentioned patents have become the industry standard and are extensively used on buses throughout the world. However, through an unexpected use of such hatches, or what might better be called a misuse, damage to the hinge and connecting linkages may result. One way the problem can begin is when maintenance personnel use the emergency unlatching mechanism to open the hatch so that they can have access to the exterior roof of the vehicle for vehicle maintenance purposes. When such personnel are finished using such hatch for maintenance purposes, they may simply close the hatch without re-latching it. Thereafter when the vehicle is driven the hatch can bounce open or be opened by the force of the wind and thereby cause the supporting hinge and attaching linkages to become severely damaged.

Another way such damage can occur is when the hatch is raised to its maximum ventilating position, wherein the hatch is parallel to the roof, and when in such raised or elevated position the vehicle is driven under or through an obstruction which contacts the hatch causing the hatch supporting hinge and attaching linkages to be damaged.

A related problem can also arise in the case where even though the hinge is damaged but the hatch is not and the user attempts to substitute an unapproved replacement hinge which can result in the ultimate inoperativeness of the hatch assembly either for escape or ventilation purposes.

It is the purpose of the present invention to provide a new and improved hatch supporting assembly which will essentially prevent the hatch from being inadvertently damaged due to the application of unanticipated and excessive opening forces to the hatch.

DISCLOSURE OF THE INVENTION

The mounting rings of earlier related hatch mechanisms were formed of rigid or non-flexing materials. The earliest versions of these hatches utilized aluminum hatch mounting rings while a later version, as shown in Sears Pat. No. 4,495,73I, utilized a plastic material reinforced with fiberglass.

Thus with the earlier rigid mounting ring designs, any excessive hatch opening forces were transmitted directly to the hatch supporting hinge which could result in severe damage. It is the primary purpose of the present invention to provide a hatch supporting assembly wherein excessive hatch opening forces can be dissipated or absorbed by the combined flexure of the hatch mounting ring, the hatch hinge and the intermediate linkage mechanism. More specifically, the hatch mounting ring of the present invention is made in such a way as to allow the linkage supporting portion thereof to flex or resiliently yield when undue stresses are imposed thereon by the hatch. At the same time, the hatch supporting hinge is formed in such a way as to allow it to flex and thereby reduce the likelihood of breaking due to hatch induced forces. Finally, the over-center linkage mechanism which connected between the hatch supporting ring and the hinge can also be modified to absorb the hatch induced loads through its ability to flex.

The structural features of the present invention will be set forth in the detailed description which follows.

BEST MODE OF INVENTION

Figure 1:
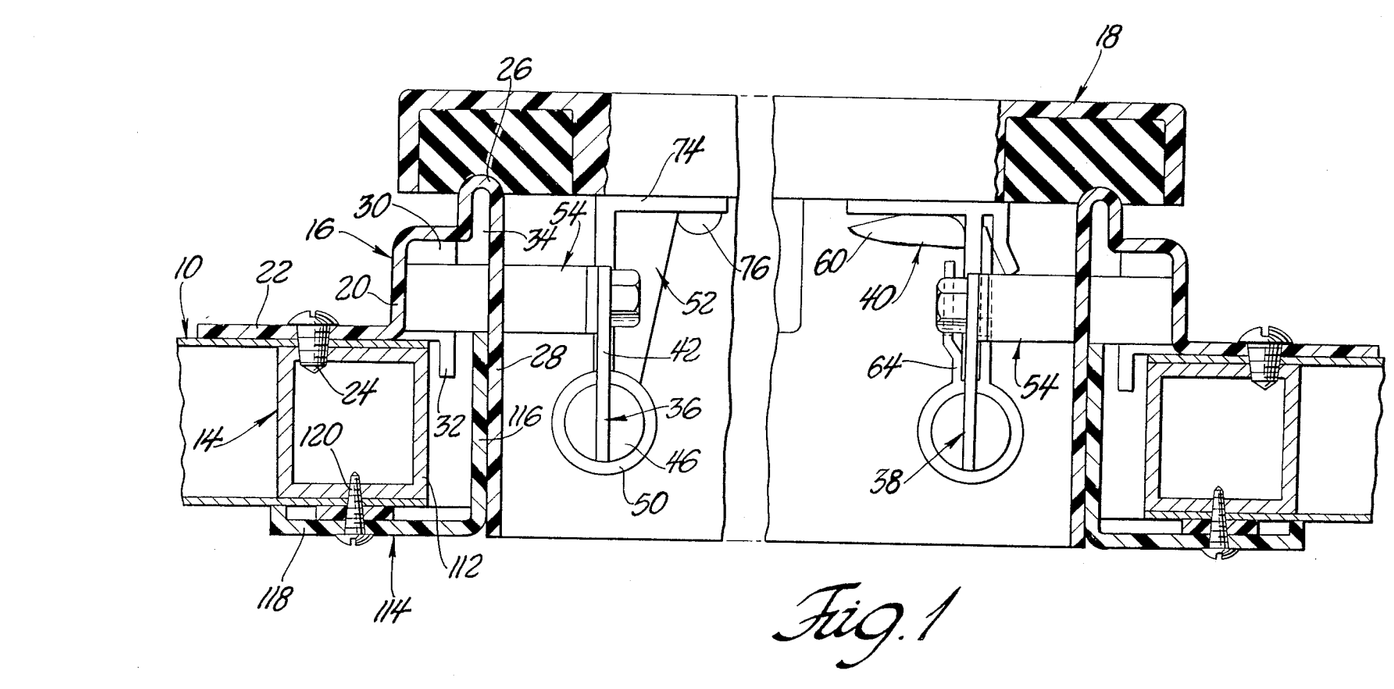
FIG. 1 is a partially sectioned side elevational view showing the hatch in its closed position and mounted over a vehicle roof opening.

As best seen in FIG. 1, a vehicle roof is indicated at 10 and includes an opening 12 defined or enclosed by a roof reinforcing frame indicated generally at 14. A hatch mounting ring 16 is disposed within the roof opening and is suitably affixed to the vehicle roof to support hatch 18. In general, the roof opening 12, the mounting ring 16 and hatch 18 are of square configurations as would be seen from a plan view.

Mounting ring 16 includes a generally upstanding or vertical portion or outer rim 20 which terminates at its lower end in a laterally outwardly extending flange 22 which is secured to the roof structure through appropriate self-tapping screw elements 24. The upper end of vertical ring portion 20 is offset laterally inwardly and upwardly to provide a hatch sealing edge 26. The inner portion of the hatch sealing edge 26 continues downwardly to define an inner rim member 28 which extends vertically below and essentially encloses the vertical extent or thickness of the hatch opening 12. Upstanding ring portion or outer rim 20 is normally parallel to the inner rim 18.

Figure 5:
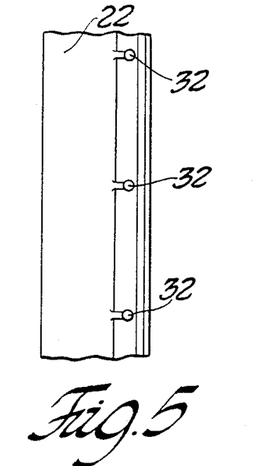
FIG. 5 is a view along line 5—5 of FIG. 2.

As seen in most of the elevational views and the bottom view of FIG. 5, the inner periphery of outer rim portion 20 includes a plurality of integral ribs 30 projecting perpendicularly inwardly and ending in laterally spaced relationship to the outer surface of inner rim 28. The inner edge of each rib terminates in a depending lug or pin-like portion 32 which extends below horizontal ring flange 22. Lugs or pins 32 are provided to locate the hatch mounting ring within the roof opening 12. Mounting ring ribs 30 coact with inner rim wall 28 to define a bezel-receiving pocket 34.

Figure 2:
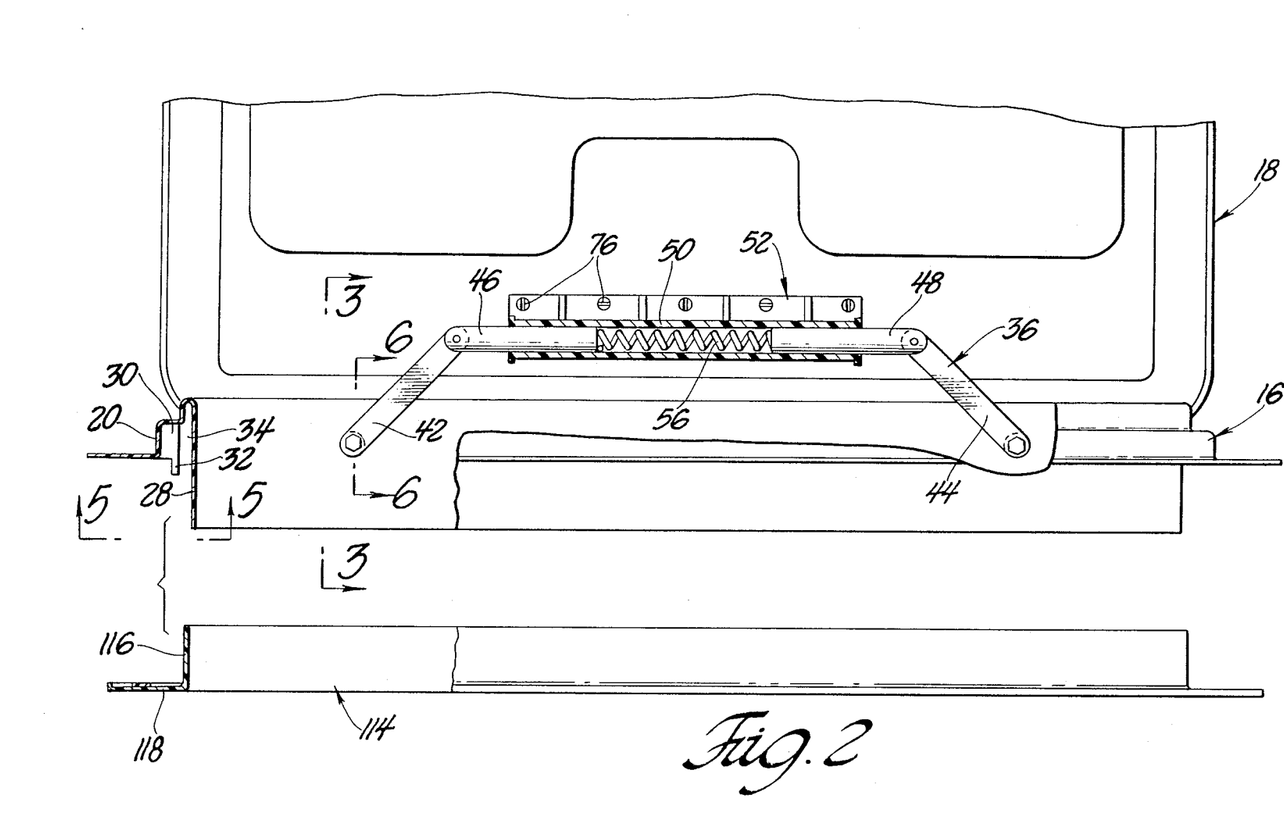
FIG. 2 is a partially sectioned elevational view with the hatch open and a bezel ring separated from the hatch supporting ring.

As best seen in FIGS. 1 and 2, hatch 18 is adapted to be supported on mounting ring 16 through over center linkage mechanisms indicated generally at 36 and 38. Except for a latch mechanism 40 associated with over center linkage device 38, the over center mechanisms are identical. The over center linkage mechanisms 36 and 38 are shown in their down or hatch closed position in FIG. 1. On the other hand, linkage mechanism 36 is shown in its up or hatch opened positions in FIGS. 2, 3 and 4. Each over center linkage mechanism includes lever members 42 and 44 secured at their inner ends to plungers 46 and 48 disposed in a tubular portion 50 of hinge bracket 52. Mounting ring 16 includes a plurality of lever-supporting elements 54 to which the outer ends of levers 42-44 are rotatably secured. A coil spring 56 is disposed within a tubular portion 50 of hinge member 52 and biases the plungers 46-48 outwardly. Thus, as the hatch is moved to an open or upward position, FIG. 2, or to a closed or downward position, FIG. 1, levers 42 and 44 move over center compressing spring 56 after which the spring forces the plungers outwardly to retain the linkage in either its open or closed position.

Figure 3:
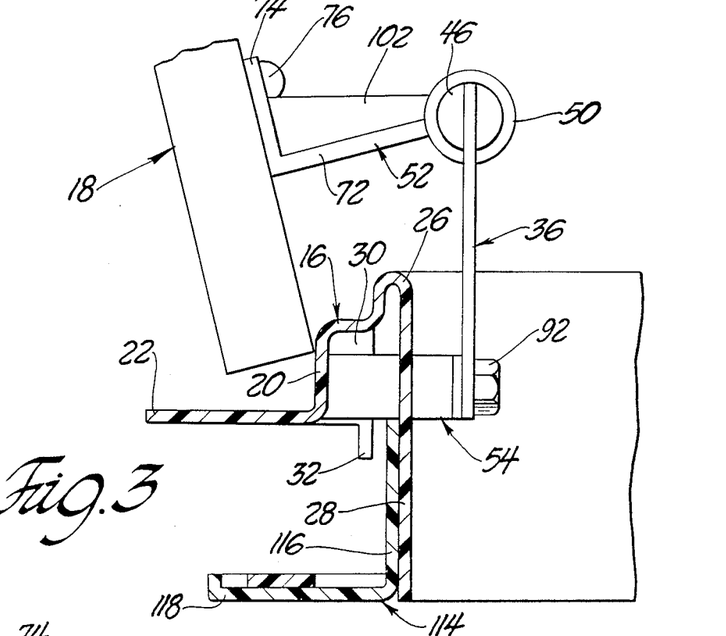
FIG. 3 is a partially sectioned fragmentary view along line 3—3 of FIG. 2.
Figure 10:
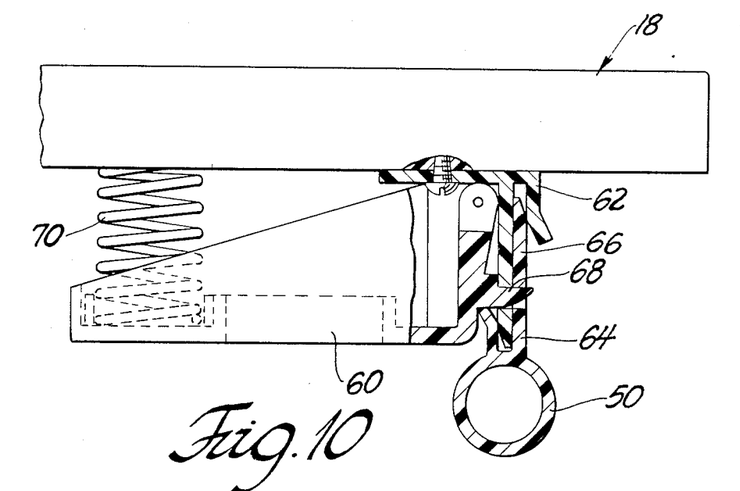
FIG. 10 is a partially sectioned elevational view showing the hatch latching mechanism.

As best seen in FIG. 10 latch mechanism 40 includes a lever or handle 60 pivotally mounted to hatch 18 through a bracket 62. The tubular portion 50 of linkage mechanism 38 includes an upwardly opening bifurcated portion 64 into which a depending portion 66 of bracket 62 is adapted to nest and be retained by a plurality of lugs 68 projecting from latch handle 60 and extending through aligned slots in bifurcated linkage portion 64 and depending portion 66 of bracket 62. A spring member 70 is disposed between hatch 18 and handle 60 and biases the handle to its down position. To open hatch 18 for emergency escape purposes, latch handle 60 is moved upwardly against the force of spring 70 pivoting the handle and withdrawing lugs 68 from corresponding slots in hatch mounted bracket portion 66 allowing the hatch to be disconnected from linkage 38 as shown in FIGS. 2 and 3. As thus far described, the over center linkage mechanism is the same as in earlier and related hatch mechanisms shown in U.S. Pat. Nos. 4,021,073 and 4,495,731.

Hatch hinge 52 is generally of an L-shaped configuration including a main portion 72 one end of which has tubular portion 50 integrally formed therewith and the other end of which includes a hinge mounting flange portion 74. Flange portion 74 is secured to the inner surface of hatch 18 through a series of self-tapping screws 76.

Figure 6:
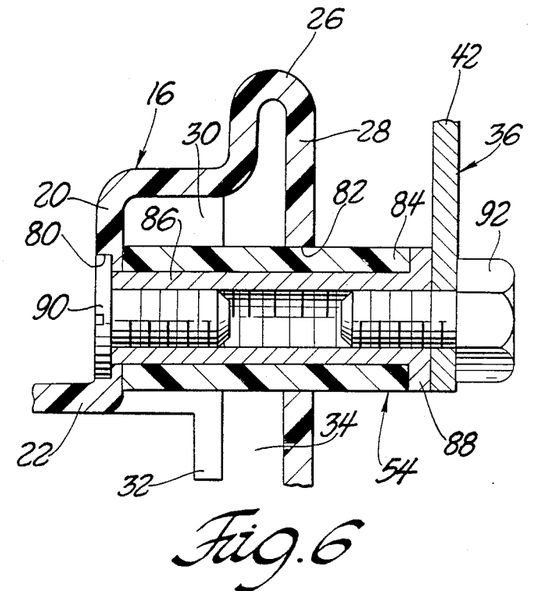
FIG. 6 is a view along line 6—6 of FIG. 2.

Referring specifically to FIG. 6, the lever supporting members 54 of mounting ring 16 will now be described in greater detail. A pair of laterally aligned openings 80 and 82 are respectively formed in outer and inner rim members 20 and 28 of the mounting ring. Lever supporting member 54 is actually comprised of a plurality of parts including a first plastic tubular member 84 and inner tubular member 86 made, for instance, of bronze and including an inner flange 88. The inside of metal tubular member is threaded to respectively receive stud or bolt members 90 and 92. After mounting ring 16 has been molded, lever mounting element 54 is inserted through inner rim opening 82 until the innermost end of the sleeve 84 abuts against the inner surface of outer rim 20. Stud member 90 is then threaded within the inner metallic sleeve 86 thereby securing lever mounting member 54 to the mounting ring. Thereafter, outer end of linkage lever 42 is secured to the mounting member through stud 92 whereby the lever 36 may be rotated relative to the mounting member.

Figure 4:
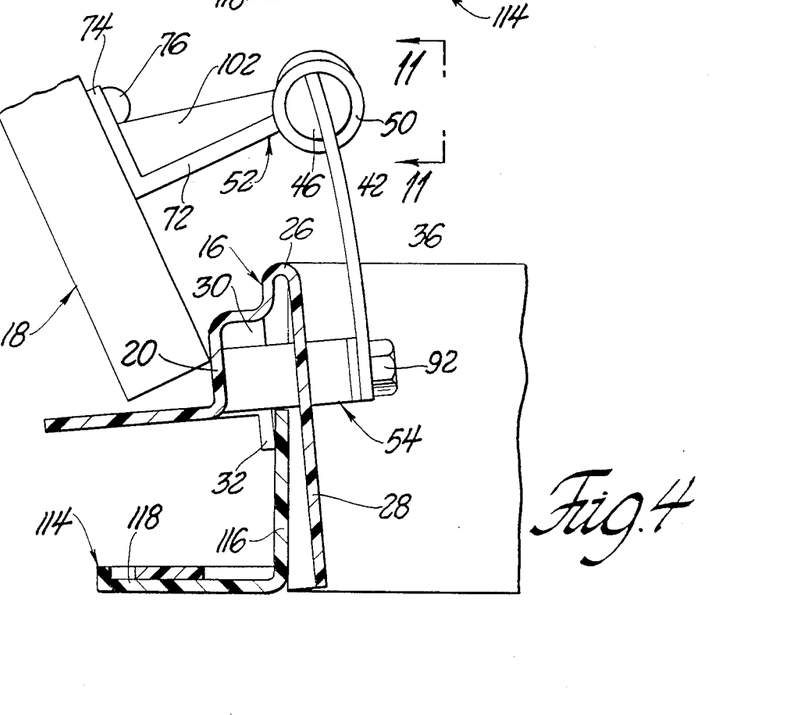
FIG. 4 is a view like FIG. 3 with the hatch moved beyond its normal opened position causing distortion of the hatch supporting ring.

At this point it is again appropriate to remember the construction of earlier hatch mounting rings and associated devices, the potential for damage created thereby and which potential for damage is minimized by the present invention. The earliest of these hatch mounting rings was formed of metal, usually aluminum. A later mounting ring, as shown in our U.S. Pat. No. 4,495,731, was formed of a plastic material reinforced with fiberglass. In the cases of both of these earlier devices and because of their generally square shape, the mounting rings were generally rigid and not easily deformed. Thus, for example, when the hatch was moved beyond its normal open position for escape purposes, as illustrated in FIG. 4, the edge of the hatch engaged the mounting ring and when the hatch opening moment was great enough damage could result to the hatch mounting hinge and connecting linkages.

It was first necessary to recognize that excessive hatch opening forces which heretofore could result in damage to the hatch supporting hinges could be withstood if at least certain of the hatch supporting components could be made in such a way as to accommodate such forces. Rather than making such components heavier or larger to prevent hinge damage, it was found that component flexure without permanent deformation could ameliorate the damage problem.

In the present invention, the hatch mounting ring and hatch supporting hinge are formed of a structural plastic material which has sufficient strength to support the hatch through its various functional operations and can flex without permanent deformation to an extent that excessive hatch opening forces are dissipated or withstood. Thus, the concept of the present invention is not only to form the mounting ring 16 and hatch supporting hinge 52 of a suitable category of non-reinforced plastic, but also to form the various coacting components in such a way as to assure, through component flexure, that the excessive hatch opening forces may be dissipated or absorbed in a way that minimizes damage to the hinge and connecting componentry.

A plastic material which has proved most satisfactory in the subject invention is a mixture of polycarbonate and polyester which is marketed under the trade name Xenoy by General Electric. Polycarbonate material is mentioned in Sears Pat. No. 4,495,731 where it is also indicated that the mounting ring may be made with or without reinforcing glass fibers. However, at the time of the Sears invention, the Lexan or polycarbonate material had only been used with reinforcing fibers and, was otherwise formed as to be very rigid. Xenoy was not used nor disclosed by Sears and, further, the structural details of the mounting ring of the present invention are significantly different than those disclosed in the Sears patent.

Referring first to the hatch mounting ring 16 and particularly to FIGS. 3 and 4, the inner and outer normally parallel rim walls 20 and 28 have a nominal wall thickness of 0.150 inch with an acceptable range of 0.130 to 0.160 inch. The nominal thickness of ring flange 22 is 0.180 inch.

The hatch as viewed in FIG. 3 is in its normal open escape position with no abnormal opening forces applied thereto. FIG. 4 depicts the hatch with excessive opening forces applied thereto and which with previous hatch support constructions could result in severe damage to the hinge and related componentry. However, in the present invention and as seen in FIG. 4, as such excessive opening forces are applied mounting ring rims 20 and 28 are able to flex and thereby help to dissipate such forces. Levers 42 and 46 will also flex to also withstand such forces.

Figure 11:
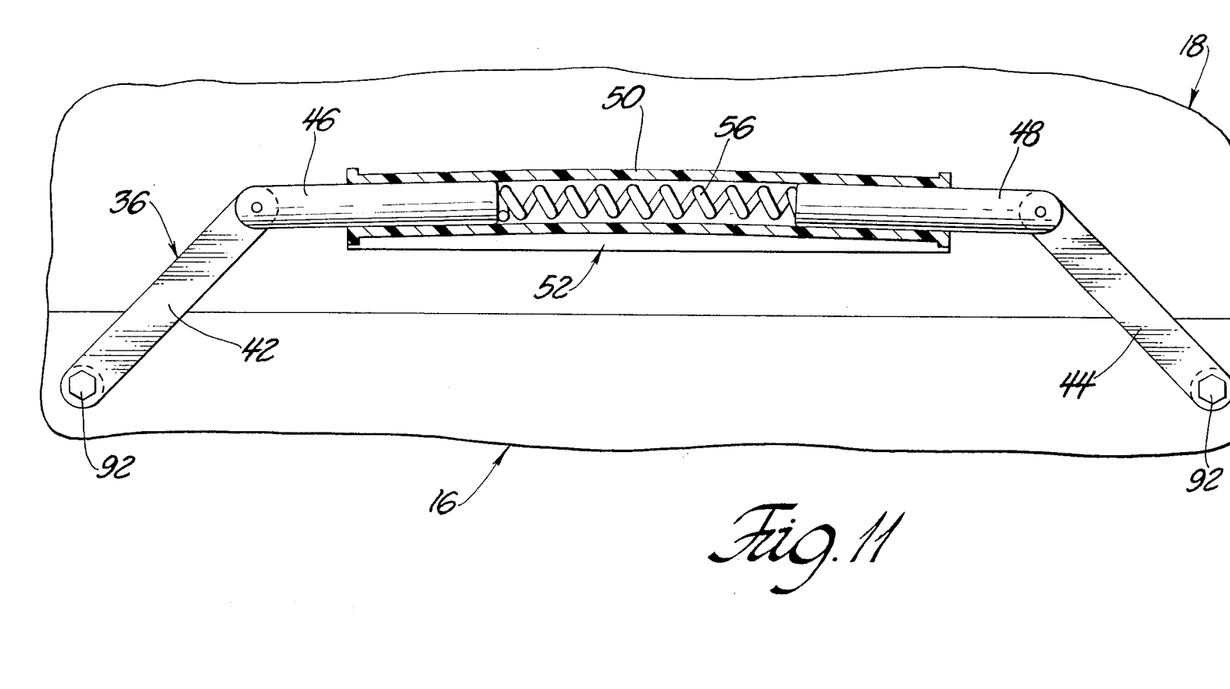
FIG. 11 is a view along line 11—11 of FIG. 4 showing the bending of the hatch hinge.

Hatch hinge 52 is also made of Xenoy with all walls having a nominal thickness of 0.125 inch and a thickness range of 0.110 to 0.140 inch. As seen in FIG. 4 tubular portion 50 of hinge 52 also bows or flexes to further absorb the excessive forces. The bowing or arcing of tubular portion 50 is also seen in FIG. 11. It has been demonstrated that with the components as described the hatch can be forced open until it is positioned horizontally against the vehicle roof without damaging the hinge and related componentry.

Over-center linkage levers 42–44 and plungers 46–48 may be made of metal e.g. aluminum coated with Teflon. Alternatively, the levers and/or the plungers may also be made of a high strength lubricious plastic such as nylon or acetal. The particular advantage of forming levers 42–44 of such plastics is to avoid the occasional problem wherein metal levers exceed their elastic limit and retain a bend requiring straightening or lever replacement.

Figure 7:
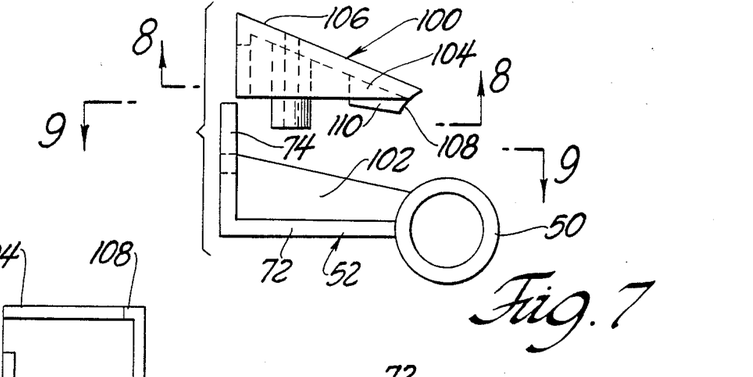
FIG. 7 is an exploded view of a modified hatch hinge and an associated cover.
Figure 8:
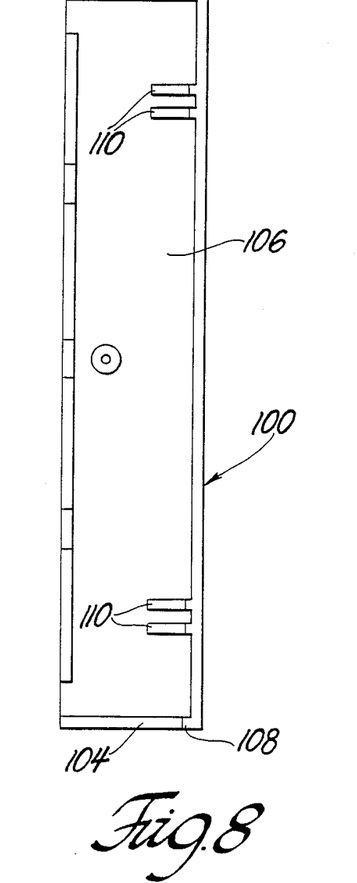
FIG. 8 is a view along line 8—8 of FIG. 7.
Figure 9:
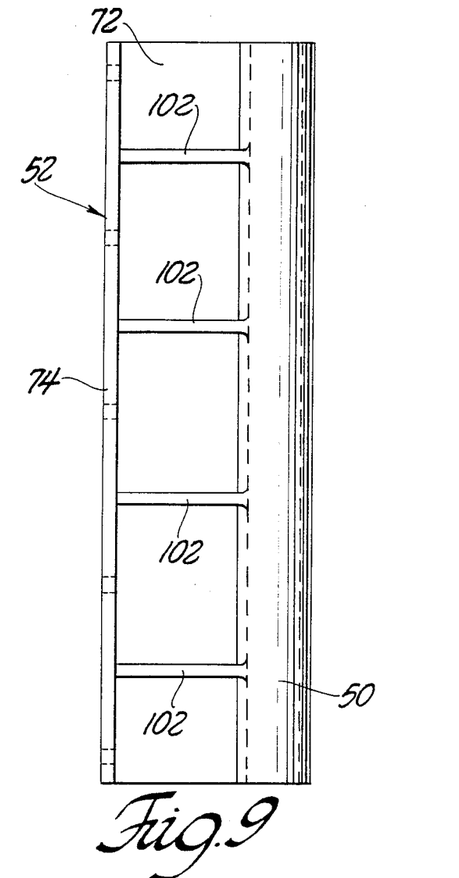
FIG. 9 is a view along line 9—9 of FIG. 7.

In order to prevent unauthorized tampering with the fasteners 76 of hatch hinge 52 as well as to provide a more finished appearing assembly, a hinge cap 100 is provided and as seen in FIGS. 7 and 8. Hinge 52 includes a plurality of ribs 102 extending between tubular portion 50 and flange 74. Cover 100 includes end walls 104 adapted to seat upon hinge wall 72 and a downwardly sloping top wall 106. End walls 104 include curved portions 108 adapted to abut against tubular portion 50. The inside of cap 100 includes a pair of bifurcated projections 110 adapted to respectively straddle and be adhered to the outermost ribs 102 to retain the cap upon the hatch hinge. The cap also includes a supporting stud 112 which seats against hinge wall 72.

As seen in FIGS. 1 and 2 a bezel ring is indicated generally at 114 and includes an upstanding rim 116 and a lateral flange 118. Bezel is mounted to the vehicle roof structure with screws or blind rivets 120 which extend through bezel flange 11 and into roof opening frame 14. As mounted, bezel ring 116 extends within the bezel opening 34 of mounting ring 16. As seen in FIG. 4, when the inner rim 28 flexes under unusual hatch opening force it moves inwardly and away from bezel rim 116. Thus, the bezel ring is not subjected to any hatch opening forces and cannot be damaged thereby.

Other modifications can be made within the intended scope of the invention as set forth in the hereinafter appended claims.

What is claimed is:

1. In an assembly of the type for mounting an outwardly opening hatch (18) in a passenger vehicle opening (12), said assembly including a mounting ring (16), said ring having an integral continuous upstanding portion having an upper edge (26) which forms a hatch sealing edge, said ring having an integral mounting flange portion (22) extending laterally outwardly and overlaying the outside marginal edge of the hatch opening, and a plurality of over-center hinge linkage devices (36 and 38) respectively connected both to the hatch and the mounting ring to permit the hatch to be opened and closed relative to the vehicle hatch opening, each hinge device (36 and 38) including a first member (52) fixed to the interior of the hatch, a plurality of hinge supporting elements (54) projecting laterally inwardly from said mounting ring, each hinge linkage device including lever members (42 and 44) pivotally connected to various of the hinge supporting elements to enable the hatch to be raised above the opening, one hinge linkage device (38) including a latch mechanism (40) adapted to disconnect its associated first member from the mounting ring to enable the hatch to swing open relative to the mounting ring (16) and the vehicle hatch opening (12), a downwardly opening bezel receiving pocket (34) formed in said mounting ring, and a trim bezel (114) of a generally L-shaped configuration having a rim (116) adapted to project within the bezel pocket and a second laterally extending flange (118) adapted to trim the hatch opening, the improvement comprising:

said mounting ring (16) being a molded plastic member having
   a. a first thin wall inner rim (28) depending downwardly from said sealing edge,
   b. a second thin wall outer rim (20) spaced laterally outward of the first rim and terminating in the laterally outwardly extending flange (22),
   c. said inner rim (28) projecting downwardly below flange (22) of the outer rim and substantially enclosing the hatch opening periphery,
   d. the inner and outer rims (20 and 28) defining the bezel receiving pocket (34),
   e. the hinge supporting elements (54) projecting inwardly beyond the inner rim (28) whereby when the hatch swings open about at least one of said hinge devices (36) the inner rim can elastically deform laterally inwardly to absorb the hatch opening force and protect the hinge device against damage.

2. An assembly as set forth in claim 1 wherein the first member (52) of the hinge device is made of a plastic material whereby a portion (50) of said member will also elastically deform to absorb the hatch opening force.

3. An assembly as set forth in claim 2 wherein the hinge device first member (52) includes tubular portion (50) adapted to receive plungers (46–48) respectively articulated at their outer ends to linkage levers (42–44), spring means (56) disposed within the tubular portion and outwardly biasing the plungers, an L-shaped bracket (72–74) integral with and extending laterally from the tubular portion (50), the laterally outermost end of the bracket relative to the tubular portion terminating in a flange (74), fastening means (76) for securing the bracket flange to the hatch, said tubular portion (50) being elastically deformable about its longitudinal axis so as to cause said tubular portion to have an arcuate bend when resisting the hatch opening force.

4. An assembly as set forth in claim 3 wherein the L-shaped bracket (72–74) includes a plurality of integral ribs (102) extending generally radially from the tubular portion (50) to the flange (74), and a cover (100) enclosing said flange and said ribs to prevent access to the fastening means (76).

5. An assembly as set forth in claim 4 wherein the cover (100) includes a pair of bifurcated projections (110) adapted to respectively slide over and be adhered to a subadjacent pair of bracket ribs (102) to attach said cover to said bracket.

6. An assembly as set forth in claim 1 wherein a plurality of transversely aligned openings (80 and 82) are formed respectively in the outer and inner rims (20 and 28), each hinge supporting outer element (54) extends through the inner rim opening (82) and is secured to the outer rim (20) whereby both the inner and outer rims may be elastically deformed to absorb the hatch swinging force.

7. An assembly as set forth in claim 6 wherein each hinge supporting element (54) comprises a first plastic tubular member (84) supported within one of said inner rim openings (82), a second and internally threaded tubular member (86) disposed within said first tubular member and including a collar (88) abutting against the innermost end of the first tubular member, a stud (92) threaded into the innermost end of the second tubular member for pivotally mounting each linkage lever (42-44), a second stud (90) extending through the opening (80) in outer rim (20) and threaded into the outer end of the second tubular member (86) to secure the hinge supporting element to the hatch mounting ring.

8. An assembly as set forth in claim 1 wherein the outer rim (20) of the hatch supporting ring includes a plurality of integral ribs spaced about the inside rim perimeter, the ribs terminating in a laterally spaced relation to the inner rim (28) and coacting therewith to define the bezel pocket (34).

9. An assembly as set forth in claim 8 wherein each rib includes a portion (32) depending below the laterally extending ring flange (22), said rib portions (32) adapted to center the mounting ring within the vehicle hatch opening.

* * * * *